3,404,018
ESTERS OF POLYEPOXIDES AND HYDROXY-
CARBOXYLIC ACIDS
Darrell D. Hicks, Louisville, Ky., assignor to Celanese
Coatings Company, a corporation of Delaware
No Drawing. Filed Sept. 27, 1965, Ser. No. 490,708
9 Claims. (Cl. 106—252)

ABSTRACT OF THE DISCLOSURE

Aliphatic hydroxy-containing esters of polyepoxide resins are prepared by esterifying a polyepoxide resin with a hydroxy-aliphatic monocarboxylic acid wherein the esterification reaction takes place between the carboxylic acid group of the acid and the epoxide groups of the polyepoxide resins. Well cured coatings having excellent resistance and durability properties can be made from these esters in admixture with hydroxy reactive cross-linking agents.

---

This invention in one of its aspects relates to aliphatic hydroxy containing resinous compositions. In another of its aspects, the invention pertains to the use of such resinous compositions and to products produced therefrom.

According to the present invention, aliphatic hydroxy-containing fusible resinous compositions are produced by the reaction of mono- or polyhydroxy-monocarboxylic acid compounds with polyepoxide resins under conditions which promote the reaction between carboxylic acid groups and epoxide groups to the exclusion of reactions between the hydroxy groups with epoxide and acid groups. The produced compositions contain a plurality of hydroxy groups which are readily available for further reactions.

When a carboxylic acid reacts with an epoxide group, an ester group and a hydroxy group are formed.

(I)
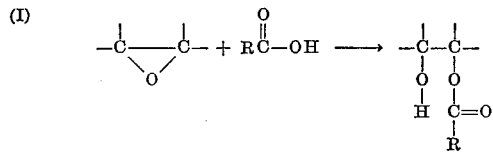

This hydroxy group has limited reactivity due to its proximity to the ester group and to its position within the resin molecule. The limited reactivity can be the result of steric hindrance, hydrogen bonding or a combination of the two.

The esterification of polyepoxide resins with mono-carboxylic acids is a well known reaction and is described in U.S. Patents 2,456,408 and 2,653,141. Polyepoxide resin esters which have found wide usage in the coatings industry are the drying oil esters, i.e., esters made by reacting unsaturated fatty acids with polyepoxide resins. Such esters form cross-linked films by autoxidation and are very useful in air-dry- and bake-coating applications. However, coatings so produced have the inherent disadvantage of autoxidative cured films in that they become brittle with age and are somewhat lacking in resistance properties. Esters prepared from saturated monocarboxylic acids do not cross-link by autoxidation since they contain no fatty unsaturation. Although these esters can contain hydroxy constituents as pointed out in chemical Equation I, the esters do not cure satisfactorily when co-reacted with hydroxy reactive cross-linking agents.

The compositions of this invention contain hydroxy groups over and above those resulting from the carboxylic acid-epoxide reaction.

(II)
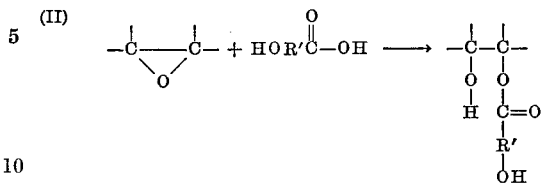

These additional hydroxy groups are more accessible for further reactions since they are appended to the resin molecule and have less tendency to be hindered by steric factors or hydrogen bonding. Well-cured compositions are obtained from the esters of this invention when co-reacted with hydroxy reactive cross-linking agents. Well cured coatings can be made which have excellent resistance and durability properties.

The hydroxy-monocarboxylic acid compounds useful in making the resinous compositions of this invention are simple hydroxy-monocarboxylic acids, for example, hydroxyacetic acid, and complex hydroxy-monocarboxylic acid compounds, for instance the half ester of a glycol and phthalic anhydride. These hydroxy-monocarboxylic acid compounds have an average of only one carboxylic acid group per molecule and an average of at least one aliphatic hydroxy group per molecule. These compounds contain no other groups reactive with epoxide groups.

The simple hydroxy-monocarboxylic acids contemplated for use in this invention include hydroxyacetic acid, which is also known as glycolic acid, lactic acid, hydroxybutyric acid, hydroxycaprylic acid, hydroxyvaleric acid, ricinoleic acid, dimethylol propionic acid and the like.

The complex hydroxy-monocarboxylic acid compounds that can be utilized in this invention are half esters of aliphatic polyols and dicarboxylic acids. These compounds, preferably, are prepared by reacting an aliphatic polyol and a dicarboxylic acid anhydride in a molar ratio of 1 to 1 under conditions whereby the anhydride ring is opened forming an ester group between one carboxylic acid group of the anhydride and one hydroxy group of the polyol but leaving the remaining carboxylic acid group and the remaining hydroxy groups unesterified.

Hydroxy-monocarboxylic acid compounds can also be prepared by reacting a dicarboxylic acid with a polyol in a molar ratio of 1 to 1 under esterification conditions. The esterification reaction can be followed by analyzing the reactants for acid content and stopping the reaction when the acid value indicates that the half ester has been formed.

Another method for obtaining hydroxy-monocarboxylic acid compounds is by the reaction of a dicarboxylic acid with a monoepoxide or a cyclic carbonate, wherein the acid and the epoxide or carbonate are reacted in a molar ratio of 1 to 1.

Polyols from which complex hydroxy-monocarboxylic acid compounds are prepared include ethylene glycol, propylene glycol, butanediol, polyethylene glycols, polypropylene glycols, polybutylene glycols, di(hydroxyethyl) ethers of dihydric phenols, di(hydroxypropyl) ethers of dihydric phenols, glycerine, sorbitol, hexanetriol, trimethylol ethane, trimethylol propane, pentaerythritol, dipentaerythritol, and so forth.

Dicarboxylic acid anhydrides which can be reacted with polyols to form complex hydroxy-monocarboxylic acid compounds are, for example, maleic anhydride, succinic anhydride, dodecenyl succinic anhydride, phthalic anhydride, tetrahydrophthalic anhydride, hexahydrophthalic anhydride, dichloromaleic anhydride and hexachloroendomethylene tetrahydrophthalic anhydride.

Dibasic acids which can be used to make the half ester compounds include the acids of the above listed anhydrides as well as oxalic acid, glutaric acid, adipic acid, pimelic acid, suberic acid, azelaic acid, dimer acids of unsaturated fatty acids, isophthalic acid and terephthalic acid.

Monoepoxides and cyclic carbonates which can be used in place of polyols for reacting with dibasic acids to form the complex hydroxy-monocarboxylic acid compounds are ethylene oxide, propylene oxide, butylene oxide, styrene oxide, phenyl glycidyl ether, glycidol, glycidyl acetate, the monoglycidyl ether of trimethylol propane, ethylene carbonate, propylene carbonate, glycerine carbonate, etc.

Aliphatic hydroxy-containing fusible resinous compositions are produce by the reaction of hydroxy monocarboxylic acid compounds with polyepoxide resins which contain more than one vicinal epoxy group per molecule. Polyepoxide resins are well known compositions and any of these can be employed in these reaction.

One class of useful polyepoxide resins include the polyglycidyl ethers of polyhydric alcohols and polyhydric phenols. Such compounds are produced by reacting a polyhydric alcohol or a polyhydric phenol with epihalohydrin or glycerol dihalohydrin and are monomeric or polymeric products characterized by the presence of more than one terminal 1,2 epoxy group Monomeric polyglycidyl polyethers include the glycidyl polyethers of polyhydric phenols obtained by reacting in an alkaline medium a polyhydric phenol with an excess of an epihalohydrin. Thus a polyether which is substantially a diglycidyl ether is obtained by reacting 2,2-bis-(4-hydroxyphenyl) propane (commonly known a Bishphenol A) in an excess of epichlorohydrin with caustic alkali. Other polyhydric phenols that can be used for this purpose include resorcinol, catechol, hydroquinone, methylresorcinol, 2,2-bis-(4-hydroxyphenyl) butane, 4,4'-dihydroxybenzophenone, bis-4-hydroxyphenylethane, and 1,5-dihydroxynaphthalene. Additional polyhydric phenols include 1,1,2,2-(tetrakis-4-hydroxyphenyl) ethane, 1,1-5,5-(tetrakis hydroxyphenyl) pentane, and novolak resins which are the products of phenol and substituted phenols with formaldehyde or other aldehydes.

Polymeric polyepoxide resins are produced by reacting a polyhydric phenol, such as Bisphenol A, with epichlorohydrin using different proportions of reactants. These proportions of reactants can be varied from 1 mol of dihydric phenol with 1.2 up to about 2 mols of epichlorohydrin. Examples for the preparation of these polymeric glycidyl polyethers are described in U.S. Patent 2,582,985 and U.S. Patent 2,615,007. Glycidyl polyethers of polyhydric alcohols which can be used in the process of this invention are prepared by reacting epichlorohydrin with a polyhydric alcohol using as a catalyst an acid acting compound such as boron trifluoride and then dehydrohalogenating the resulting compound with an alkaline material. Examples for the prepartion of these glycidyl polyethers are described in U.S. Patent 2,581,464 and U.S. Patent 3,033,803. Polyhydric alcohols used in preparing these polyglycidyl ethers include glycerol, propylene glycol, ethylene glycol, trimethylene giycol, butylene glycol, trimethylol propane, trimethylol ethane, pentaerythritol, polyoxyalkylene glycols and the like.

Other examples of polyepoxide resins include epoxidized esters of polyethylenically unsaturated monocarboxylic acids such as epoxidized linseed, soya bean, perilla, oiticica, tung, walnut and dehydrated caster oil, methyl linoleate, butyl linoleate, monoglycerides of tung oil fatty acids, monoglycerides of soya bean, sunflower, hempseed, sardine, cottonseed oil and the like.

Another group of polyepoxide resins includes the glycidyl esters of polybasic acids such as adipic, pimelic, suberic, azelaic, sebacic, dimer acids of unsaturated fatty acids, maleic, phthalic, terephthalic, isophthalic and so forth. Another group of polyepoxide resins used in preparing the product of this invention include the epoxidized esters of unsaturated monohydric alcohols and polycarboxylic acids, such as, for example, di-2-3-epoxy butyl adipate, di-2,3-epoxy butyl oxalate, di-2,3-epoxy hexyl succinate, di-3,4-epoxy butyl maleate, and so forth. Still another group of epoxide compounds comprises the epoxidized polyethylenically unsaturated hydrocarbons such as epoxidized 2,2-bis-2-cyclohexenylpropane, epoxidized vinylcyclohexene and epoxidized dimer of cyclopentadiene. Such compounds also include 3,4-epoxy-6-methylcyclohexylmethyl-3-4 - epoxy - 6 - methylcyclohexanecarboxylate and butadiene dioxide.

Still another group polyepoxide resins includes the epoxidized polymers and copolymers of diolefins, among which are epoxidized polybutadiene, butadiene-acrylonitrile copolymers, butadiene-styrene copolymers and the like. Still another group of polyepoxide resins is the polymers and copolymers of epoxy-containing materials which also contain a polymerizable double bond. Such resins include polymers and copolymers of glycidyl acrylate, glycidyl methacrylate, and allyl glycidyl ether.

The aliphatic hydroxy-containing fusible resinous compositions of this invention are prepared by reacting a hydroxy-monocarboxylic acid compound with a polyepoxide resin in a ratio of 1 mol of hydroxy-monocarboxylic acid per 1 to 1.5 epoxide groups of the polyepoxide resin at a temperature in the range of about 100° C. to about 180° C. Within this temperature range, the predominant reaction is the addition of epoxide groups and carboxylic acid groups with little or no reaction of carboxylic acid groups with hydroxy groups or epoxide groups with hydroxy groups. The reaction of epoxide groups and carboxylic acid groups will take place under the influence of heat alone. However, it is preferred to use a basic type catalyst for the reaction. Such catalysts include tertiary amines, tertiary amine salts, quarternary ammonium hydroxides, quaternary ammonium salts, alkali metal hydroxides, and alkaline earth metal hydroxides. These catalysts are used in the amounts of about 0.1 to 5 percent by weight, based upon the total weight of the reactants.

When a hydroxy-monocarboxylic acid compound is reacted with a diepoxide, the preferred ratio of acid groups to epoxide equivalents is 1 to 1. Using this ratio, the reaction can be readily conducted to an acid value below 30 (generally 10 to 20) without an excessively long heating period and without side reactions which result in color formation and gelled structures. Somewhat higher ratio, say 1.1 or 1.2 epoxide equivalents per acid group, can be used in order to shorten the reaction period or to enable the acid value to be more readily lowered below 10.

However, when a polyepoxide having more than 2 epoxide groups is used in this reaction, somewhat higher ratios of epoxide equivalents to acid groups are desirable. Higher ratios, up to 1.5 epoxide equivalents per acid group, enable an acid value below 50 to be attained without unduly long reaction times or gel formation.

The compositions of this invention can be prepared with no solvents if the reactants and reaction products are fluid and stirrable at the reaction temperature. However, it is generally preferred to carry out the reaction in a solvent. Solvents that can be used include aliphatic and aromatic hydrocarbons, ethers, esters, ketones, alcohols, ether alcohols, ether esters and various mixtures of these. The use of an alcohol solvent is often advantageous in that it tends to repress the formation of by-products.

The hydroxy-containing fusible resinous compositions of this invention can be modified by reaction with drying oil, semi-drying oil and non-drying oil acids, with dibasic acids and dibasic acid anhydrides.

The compositions of this invention have been found to be eminently suitable for use as surface coatings, adhesives, impregnating compounds and the like. Before use, these compositions are blended with an aminoplast resin, a phenolplast resin or a polyisocyanate. Useful aminoplast resins include the reaction products of an aldehyde with urea, thiourea, ethylene urea, melamine, benzoguanamine, acetoguanamine, dicyandiamide and the like. The aldehydes that can be used for reaction with the above-named compounds are formaldehyde, acetaldehyde, and the formaldehyde compounds paraformaldehyde and trioxane. The aminoplast resins are preferably etherified with an alcohol such as methyl, ethyl, butyl, amyl, hexyl or octyl alcohol.

Phenolplast resins used in combination with the compositions of this invention are those resins resulting from the reaction of a phenol with a molar excess of an aldehyde.

The aminoplast resins are blended with the resinous hydroxy-containing compositions of this invention in amounts ranging from 10 to 60 percent by weight based on the total weight of the blend.

Acid catalysts, such as paratoluene sulfonic acid, butyl acid phosphate and phosphoric acid can be added to the blends of aminoplast or phenolplast resins and the resins of this invention to increase the rate of the curing reaction, producing films that will cure at a lower temperature or in a shorter time. Up to 2 percent by weight of such acid catalysts based upon the total weight of the blend have been found to be advantageous in some instances.

Coating compositions prepared from a resin of this invention together with an aminoplast or phenolplast resin can be pigmented or unpigmented, and can be applied to a substrate by conventional means such as brushing, spraying, dipping, and roller-coating. The coatings are cured by heating at 100° C. to 250° C. for a time sufficient to effect a cure, such times generally being from about five minutes to about one hour.

The hydroxy-containing resinous compositions of this invention can also be cured with polyisocyanates, for instance tolylene diisocyanate, these isocyanates being used in the proportions of 0.5 to 1.5 isocyanate groups per hydroxyl group of the resinous composition. Additional curing agents are epoxide resins and epoxide resins in combination with dicarboxylic acid anhydrides.

This invention is further described by the following specific examples. Parts, as expressed in these examples, is understood to be parts by weight. The epoxide compounds used in the examples are identified as follows:

Epoxide A—the diglycidyl ether of Bisphenol A having an epoxide equivalent weight of 190
Epoxide B—the reaction product of 1.57 mols of epichlorohydrin and 1 mol of Bisphenol A, said product having an epoxide equivalent weight of 490 and a melting point of 70° C.
Epoxide C—3,4 - epoxy - 6 - methylcyclohexylmethyl-3,4-epoxy-6-methylcyclohexanecarboxylate
Epoxide D—epoxidized linseed oil, having an epoxide equivalent weight of 177
Epoxide E—epoxidized polybutadiene, having an epoxide equivalent weight of 177 and a viscosity at 25° C. of 1800 poises Example 1

To a suitable reaction flask equipped with a thermometer, stirrer and condenser were added 80 parts of phthalic anhydride, 162.5 parts of polyethylene glycol (average molecular weight 300) and 20 parts of xylene. Heat was applied raising the temperature to 140° C. The temperature was held at 120° C. to 140° C. for one hour to form mono(polyethylene glycol 300) phthalate. The temperature was then lowered to 40° C. and 257.5 parts of Epoxide B, 42.5 parts of xylene and 62.5 parts of methyl isobutyl ketone were added to the flask. Heat was applied and at 88° C., 8.3 parts of a 60 percent solution of benzyl trimethyl ammonium chloride in water were added. The temperature was held at 90° C. for 1.5 hours after which time the acid value of the reactants was 29.8. An additional two hours heating at 115° C. to 120° C. lowered the acid value to 15.6.

To 15 parts of the resulting hydroxy terminated epoxide resin solution were added 13.3 parts of a butylated urea-formaldehyde resin at 60 percent solids in xylene and butanol plus 11.7 parts of xylene. Films were drawn down on glass panels with a 3 mil doctor blade and were baked for 15 minutes at 200° C. The resulting films were well cured and exhibited excellent flexibility, hardness and mar resistance.

Example 2

Using the same procedure as described in Example 1, mono (pentaerythritol) phthalate was prepared by heating 89.5 parts of pentaerythritol and 97.5 parts of phthalic anhydride for one hour at 120° C. This hydroxy-carboxylic acid was then reacted with 313 parts of Epoxide B for seven hours at 118° C. to 124° C. to an acid value of about 10. The resulting product was recovered at 43.5 percent solids in a mixed solvent system (14 percent xylene, 14 percent methyl isobutyl ketone, 68 percent ethylene glycol monoethyl ether acetate and 4 percent n-butanol). To 29.1 parts of this solution were added 5 parts of a butylated urea-formaldehyde resin at 60 percent solids in butanol and xylene. After the addition of 5.9 parts of butanol, 3 mil films were drawn down on glass panels, and were baked for 15 minutes at 200° C. The resulting films were well cured and exhibited excellent hardness, excellent adhesion to the substrate and good mar resistance.

Example 3

To a suitable reaction flask equipped as described in Example 1, were added 307.5 parts of phthalic anhydride, 202.5 parts of glycerine and 45 parts of xylene. Heat was applied to the flask raising the temperature of the reactants to 120° C. The reactants were heated at 120° C. for one hour to form mono (glycerine) phthalate. Heat was removed and at 25° C., 990 parts of Epoxide B, 205 parts of xylene and 250 parts of methyl isobutyl ketone were added to the flask. Heat was reapplied and at 93° C., 25 parts of a 60 percent solution of benzyl trimethyl ammonium chloride were added. The reactants were heated at 90° C. to 98° C. for two hours and at 115° C. for two hours. The acid value on solids basis was 25.7. 140 parts of n-butanol were added to reduce the viscosity of the solution, lowering the solids content to 70 percent.

To 11.4 parts of the resulting solution were added 3.3 parts of a butylated urea-formaldehyde resin at 60 percent solids in butanol and xylene. 3 mil films were drawn down on glass panels and were heated at 200° C. for 15 minutes. The resulting films were well cured.

Example 4

Using the same procedure as described in the preceding examples, 292.5 parts of phthalic anhydride were reacted with 265.5 parts of hexanetriol to form mono (hexanetriol) phthalate. This hydroxy-carboxylic acid was then reacted with 942 parts of Epoxide B to an acid value of 11.4. The resulting product was recovered at 70 percent solids in a mixed solvent system consisting of 30 percent xylene, 30 percent methyl isobutyl ketone and 40 percent monoethyl ether of ethylene glycol. 11.4 parts of the resulting solution were blended with 3.3 parts of a butylated urea-formaldehyde resin at 60 percent solids in butanol and xylene. 3 mil films, prepared on glass panels, were well cured after heating at 200° C. for 15 minutes.

Example 5

To a suitable reaction flask equipped as described in Example 1 were added 233.1 parts of Epoxide B, 66.9 parts of dimethylol-propionic acid, 5.5 parts of a 60 percent solution of benzyl trimethyl ammonium chloride in water and 100 parts of propylene glycol methyl ether. These reactants were heated at 120° C. for 4 hours until the acid value was 17.5 on a solids basis.

23.3 parts of the resulting solution were blended with 2.5 parts of hexamethoxymethyl melamine and 14.2 parts of propylene glycol methyl ether. After the addition of 1 percent of the morpholine salt of paratoluene sulfonic acid based on solids content, films were drawn down on glass and were baked at 180° C. for 30 minutes. The resulting films were well cured and had high gloss, excellent mar resistance, excellent adhesion and a pencil hardness of 5H to 6H.

Example 6

To a suitable reaction flask equipped as described in Example 1 were added 176.1 parts of Epoxide A, 123.9 parts of dimethylol propionic acid, 5.5 parts of a 60 percent solution of benzyl trimethyl ammonium chloride in water and 50 parts of propylene glycol methyl ether. The reactants were heated at 120° C. for three hours, after which time the acid value was found to be 8.1 on a solids basis. The resinous product was further diluted with 50 parts of propylene glycol methyl ether.

To 22.7 parts of the above solution were added 3 parts of hexamethoxymethyl melamine and 14.3 parts of propylene glycol methyl ether and after the addition of the morpholine salt of para toluene sulfonic acid (1 percent based on blend solids), 3 mil films were prepared on glass and were baked at 180° C. for 30 minutes. The resulting films were well cured, having excellent mar resistance and high gloss and a pencil hardness of 4H to 5H.

Example 7

To a suitable reaction flask equipped with a thermometer, stirrer, and an azeotropic distillation apparatus were added 146 parts of adipic acid and 412 parts of polypropylene glycol—average molecular weight 425. Next, 15 parts of xylene were added to the well of the azeotropic distillation apparatus. Heat was applied and at 196° C. water began to distill over. After heating at 196° C. to 201° C. for 1 hour and 39 minutes, 17 parts of water were collected. The acid value of the glycol-acid condensate was 90.3.

To 541 parts of the mono (polypropylene glycol 425) adipate were added 141 parts of Epoxide C and 9.9 parts of a 60 percent solution of benzyl trimethyl ammonium chloride in water. The temperature of the reactants was raised to 120° C., and was held at 120° C. for 4 hours and 50 minutes after which time the acid value of the reaction product was found to be 10.9.

With 16.8 parts of the hydroxy terminated condensate were blended 4 parts of hexamethoxymethyl melamine, 5.9 parts of propylene glycol methyl ether, and 1 part of a 20 percent solution of the morpholine salt of para toluene sulfonic acid in water. Films were prepared on glass panels using a 2 mil drawdown blade. After baking for 30 minutes at 180° C., the films were well cured and clear, exhibiting high gloss, excellent mar resistance and good adhesion.

12.1 parts of the condensate were blended with 11 parts of xylene and 16.9 parts of a polyisocyanate (adduct of 3 mols tolylene diisocyanate, 1 mol of trimethylol propane and 3 mols of phenol—isocyanate equivalent weight—335) at 50 percent nonvolatiles in ethylene glycol monoethyl ether acetate. Films were baked at 180° C. for 30 minutes and exhibited very good mar resistance, adhesion, toughness and flexibility.

Example 8

To a suitable reaction flask equipped as described in Example 1 were added 101.1 parts of dimethylol propionic acid, 198.9 parts of Epoxide D and 5.5 parts of a 60 percent solution of benzyl trimethyl ammonium chloride in water. These reactants were heated at 120° C. to 125° C. for 1 hour and 48 minutes to an acid value of 30.2. 50 parts of xylene were added to reduce the viscosity, and heating at 120° C. to 125° C. was continued for 4 hours, the acid value at the end of this heating period being below 9. The resinous composition was then diluted with 100 parts of xylene and 50 parts of propylene glycol methyl ether.

12.5 parts of this solution were blended with 4.2 parts of butylated urea-formaldehyde resin at 60 percent solids in n-butanol and xylene. After the addition of 3.3 parts of xylene, 3 mil films were drawn down on glass and were heated at 180° C. for 30 minutes. The resulting films were well cured and exhibited very good mar resistance, flexibility and toughness.

Example 9

Mono (1,4 butanediol) hexahydrophthalate was prepared from 1 mol of butanediol and 1 mol of hexahydrophthalic anhydride. The hydroxyl-containing monocarboxylic acid was then reacted with Epoxide D on the basis of 1 carboxylic acid group to 1.4 epoxide groups to an acid value of 28.

Films prepared from blends of the resulting resinous composition with 30 to 50 weight percent butylated urea-formaldehyde resin were well cured after heating for 30 minutes at 150° C.

Example 10

Mono (ethylene glycol) phthalate was prepared from 1 mol of ethylene glycol and 1 mol of phthalic anhydride. This hydroxyl containing monocarboxylic acid was reacted with Epoxide E on the basis of 1 carboxylic acid group to 1.5 epoxide groups to an acid value of 35.2.

Films prepared from the above resinous composition blended with 10 to 40 weight percent of a butylated urea-formaldehyde resin were well cured after baking at 150° C. and at 200° C. for 30 and 15 minutes.

Example 11

To a suitable reaction flask equipped as described in Example 1 were added 31 parts of ethylene glycol, 134.1 parts of dodecenylsuccinic anhydride and 20 parts of xylene. After heating for one hour at 120° C. to form mono (ethylene glycol) dodecenylsuccinic anhydride, 134.7 parts of Epoxide E, 5 parts of a 60 percent solution of benzyl trimethyl ammonium chloride in water, 220 parts of xylene and 60 parts of propylene glycol methyl ether were added. The reactants were heated at 120° C. for 11 hours to an acid value of 42.8 on solids basis.

To 16 parts of the above solution were added 3.3 parts of a butylated urea-formaldehyde resin at 60 percent solids in xylene and n-butanol. Films were prepared on glass panels from the blend and were baked at 180° C. for 30 minutes. The resulting well-cured films had excellent mar resistance, good adhesion and excellent toughness and flexibility.

Example 12

To a suitable reaction flask equipped with a stirrer, condenser, thermometer and dropping funnel were added 155.8 parts of Epoxide D. To the dropping funnel were added 63.1 parts of a 70 percent solution of hydroxyacetic acid in water. Heat was applied to the flask and at 110° C., 3 parts of a 60 percent solution of benzyl trimethyl ammonium chloride in water were added and slow addition of the hydroxyacetic acid was begun. All the hydroxyacetic acid was added in 30 minutes while the temperature rose to 121° C. A slight vacuum was applied to the flask just sufficient to allow the water in the reaction mixture to slowly distill. Heating at about 120° C. was continued for about 4 hours and 30 minutes until the acid value of the reactants was 15. 100 parts of xylene were added to the reaction product forming a clear solution.

To 9 parts of the above solution were added 6.7 parts of a butylated urea-formaldehyde resin at 60 percent solids in xylene and n-butanol. 2 mil films were prepared on glass and were baked at 180° C. for 30 minutes. The well-cured films had excellent mar resistance and adhesion to the glass.

Example 13

Using the same procedure as described in Example 1, 93 parts of phthalic anhydride were reacted with 39 parts of ethylene glycol in 20 parts of xylene for 1 hour at 120° C. The resulting mono (ethylene glycol) phthalate was then reacted with 168 parts of Epoxide D in an additional 100 parts of xylene and 100 parts of propylene glycol methyl ether using 5 parts of a 60 percent solution of benzyl trimethyl ammonium chloride in water as catalyst. After 3 hours and 30 minutes at 120° C., the acid value of the reactants was 16.

A blend was prepared from the above product solution with 13.3 parts of butylated urea-formaldehyde resin at 60 percent solids in butanol and xylene. After the addition of 5.9 parts of xylene, 3 mil films were prepared on glass and were heated at 150° C. for 30 minutes. The resulting films were well cured and exhibited good mar resistance, adhesion, flexibility and toughness.

Example 14

To a suitable reaction flask equipped as described in Example 1 were added 64.8 parts of 1,4 butanediol, 106.8 parts of phthalic anhydride and 20 parts of xylene. The temperature was raised to 120° C. and was held at 120° C. for 1 hour forming mono (1,4 butanediol) phthalate. This product was cooled to 50° C. and 128.4 parts of Epoxide D, 5 parts of a 60 percent solution of benzyl trimethyl ammonium chloride in water, 100 parts of xylene and 100 parts of propylene glycol methyl ether were added. Heat was reapplied raising the temperature to 120° C. After 11 hours at this temperature, the acid value of the reactants was 48.7 on solids basis. The resulting solution at 57.7 percent solids had a Gardner-Holdt viscosity of 0 and a Gardner color of 5 to 6.

To 27.8 parts of the above solution were added 6.7 parts of butylated urea-formaldehyde resin at 60 percent solids in xylene and n-butanol. 3 mil films were drawn down on glass and were baked at 150° C. for 30 minutes. The resulting films were well cured and had good mar resistance, adhesion, flexibility and toughness.

It is to be understood that the foregoing detailed description is given merely by way of illustration and that many variations may be made therein without departing from the spirit of the invention.

The embodiments of the invention in which an exclusive property or privilege is claimed are defined as follows:

1. A hydroxy-containing fusible resinous composition comprising the reaction product of (A) a polyepoxide resin containing more than one vicinal epoxide group per molecule and (B) a hydroxy-aliphatic monocarboxylic acid containing an average of at least one aliphatic hydroxy group per molecule, an average of only one carboxylic acid group per molecule and no other groups reactive with epoxide groups, wherein (A) and (B) are reacted in the ratio of 1 to 1.5 epoxide groups of (A) to 1 carboxylic acid group of (B) at a temperature of about 100° C. to about 180° C.

2. The composition of claim 1 wherein the hydroxymonocarboxylic acid is an aliphatic polyol half-ester of a dicarboxylic acid.

3. The composition of claim 1 wherein the polyepoxide resin is the diglycidyl ether of a dihydric phenol and wherein the hydroxy-monocarboxylic acid is mono (ethylene glycol) phthalate.

4. The composition of claim 1 wherein the polyepoxide resin is epoxidized soybean oil and the hydroxy-monocarboxylic acid is dimethylol propionic acid.

5. The composition of claim 1 wherein the polyepoxide resin is epoxidized polybutadiene and the hydroxy-monocarboxylic acid is hydroxyacetic acid.

6. The composition of claim 1 in combination with a hydroxy reactive cross-linking agent.

7. The composition of claim 6 wherein the cross-linking agent is an aminoplast resin.

8. The composition of claim 6 wherein the cross-linking agent is a polyisocyanate.

9. The cured composition of claim 6.

References Cited

UNITED STATES PATENTS

| | | | |
|---|---|---|---|
| 2,824,850 | 2/1958 | Widmer et al. | 260—43 |
| 2,907,745 | 10/1959 | Greenlee | 260—47 |

FOREIGN PATENTS

| | | |
|---|---|---|
| 652,030 | 4/1951 | Great Britain. |

MORRIS LIEBMAN, Primary Examiner.

H. H. FLETCHER, Assistant Examiner.